US011519596B2

(12) United States Patent
Altena et al.

(10) Patent No.: US 11,519,596 B2
(45) Date of Patent: Dec. 6, 2022

(54) ILLUMINATING LANDSCAPE EDGING STRIP AND METHOD OF MANUFACTURE

(71) Applicants: Robin Peter Altena, Thousand Palms, CA (US); Harry John Altena, Jr., Thousand Palms, CA (US)

(72) Inventors: Robin Peter Altena, Thousand Palms, CA (US); Harry John Altena, Jr., Thousand Palms, CA (US)

(*) Notice: Subject to any disclaimer, the term of this patent is extended or adjusted under 35 U.S.C. 154(b) by 0 days.

(21) Appl. No.: 17/393,614

(22) Filed: Aug. 4, 2021

(65) Prior Publication Data

US 2022/0113017 A1   Apr. 14, 2022

Related U.S. Application Data

(60) Provisional application No. 63/090,910, filed on Oct. 13, 2020.

(51) Int. Cl.
| | |
|---|---|
| *F21V 29/71* | (2015.01) |
| *F21S 4/24* | (2016.01) |
| *F21V 5/04* | (2006.01) |
| *F21Y 103/10* | (2016.01) |
| *F21Y 115/10* | (2016.01) |
| *F21W 131/109* | (2006.01) |
| *A01G 9/28* | (2018.01) |

(52) U.S. Cl.
CPC .............. *F21V 29/713* (2015.01); *A01G 9/28* (2018.02); *F21S 4/24* (2016.01); *F21V 5/04* (2013.01); *F21W 2131/109* (2013.01); *F21Y 2103/10* (2016.08); *F21Y 2115/10* (2016.08)

(58) Field of Classification Search
CPC ...... A01G 9/28; F21S 4/20; F21S 4/22; F21S 4/24; F21S 4/26; F21S 8/081; F21W 2111/023; F21Y 2103/10
See application file for complete search history.

(56) References Cited

U.S. PATENT DOCUMENTS

| | | |
|---|---|---|
| 2,782,561 A | 2/1957 | Smith |
| 2,821,809 A | 2/1958 | Collier et al. |
| 3,788,001 A | 1/1974 | Balfanz, Jr. |
| 3,933,311 A | 1/1976 | Lemelson |
| 4,823,521 A | 4/1989 | Kontz, Jr. |

(Continued)

FOREIGN PATENT DOCUMENTS

| | | | | |
|---|---|---|---|---|
| AT | 12028 U1 * | 7/2011 | .......... | E04F 11/1804 |
| WO | WO-2011055488 A1 * | 5/2011 | .......... | E04F 11/1836 |

*Primary Examiner* — Erin Kryukova
(74) *Attorney, Agent, or Firm* — YK Law, LLP; Michael A DiNardo (57) ABSTRACT

The present invention is directed to an illuminating landscape edging strip having an elongated edging substrate. Contained within the edging substrate are a heat sink disposed in a first slot along a long dimension of the edging substrate, a lighting strip disposed in a first channel along the long dimension of the edging substrate, and a lens disposed in a second slot along the long dimension of the edging substrate. The lighting strip abuts against and is thermally conductive to the heat sink. The lens is closely spaced apart from a light emitting surface on the lighting strip. The lens and the second slot open into light-emitting channel on a front face of the edging substrate. The upper edge of the light-emitting channel includes a bevel that increases the angle of light exposure.

11 Claims, 11 Drawing Sheets

(56) References Cited

U.S. PATENT DOCUMENTS

| | | | |
|---|---|---|---|
| 4,945,675 A * | 8/1990 | Kendrick | F21V 21/0824 47/33 |
| 5,117,583 A | 6/1992 | Reum | |
| 5,157,867 A | 10/1992 | Fritch | |
| 5,301,461 A | 4/1994 | Zwier | |
| 5,375,369 A | 12/1994 | VerHoeve | |
| 5,456,045 A | 10/1995 | Bradley et al. | |
| 5,720,128 A | 2/1998 | Smith et al. | |
| D426,322 S | 6/2000 | Anderson et al. | |
| 6,546,688 B1 | 4/2003 | Parsons | |
| 6,579,605 B2 | 6/2003 | Zehner | |
| 7,409,796 B2 | 8/2008 | Sacks | |
| 10,557,600 B1 * | 2/2020 | South | F21V 19/004 |
| 11,199,300 B1 * | 12/2021 | Irons | F21V 3/10 |
| 2003/0024157 A1 | 2/2003 | Conde | |
| 2008/0184619 A1 * | 8/2008 | Heighton | A01G 9/28 47/33 |
| 2009/0094734 A1 * | 4/2009 | Diebel | F21S 8/00 4/506 |
| 2012/0228645 A1 * | 9/2012 | Tu | F21K 9/00 257/E33.066 |
| 2012/0250301 A1 * | 10/2012 | Tung | F21V 15/015 362/217.05 |
| 2017/0198889 A1 * | 7/2017 | Li | F21V 17/007 |

\* cited by examiner

ILLUMINATING LANDSCAPE EDGING STRIP AND METHOD OF MANUFACTURE

RELATED APPLICATION

This application claims the benefit of U.S. Provisional Patent Application No. 63/090,910, filed on Oct. 13, 2020.

BACKGROUND OF THE INVENTION

The present invention relates generally to flexible landscape edging used for creating borders or dividers around various landscape features, such as gardens, lawns, flower beds, trees and the like, so as to form a boundary between adjacent landscaped areas. More particularly, the invention provides a landscape edging strip that includes an illumination device embedded therein and methods for making the same. Most preferably, the landscape edging border includes a low-voltage luminaire designed to provide a continual stripe of light along the full length, or portion thereof as dependent on the desired lighting application.

Landscape edging strips are utilized for borders or dividers so as to separate one portion of a landscaped area from other portions of the landscaped area or from non-landscaped areas and to provide a minimal barrier to the movement of water between adjacent areas. Because most landscaping does not follow nice straight lines, landscape edging strips are generally made out of materials and configured such that the individual strips are somewhat flexible. Due to the outdoor environmental use for landscaping edging strips, it is well known that landscape edging strips must be made out of materials that are suitably resistant to corrosion, mildew and pests.

Because the landscape edging is used in and around areas where gardening tools and activity takes place, it is necessary that the landscape edging be sufficiently durable to maintain its functionality when contact, inadvertent or otherwise, with such tools and activity occurs. In addition, because landscaped areas are generally designed to be visually appealing, it is important that the landscape edging be made out of materials and be configured such that, at the least, it does not significantly detract from the visual nature of the landscaping.

A significant number of prior art landscape edging systems, utilizing a wide range of materials and configured in a variety of different ways, are known in the industry. Some of these prior art edging materials, exemplified by U.S. Patent Publication No. 2003/0024157 to Conde (published Feb. 6, 2003), U.S. Pat. No. 5,720,128 to Smith, et al., U.S. Pat. No. 5,456,045 to Bradley et al. and U.S. Pat. No. Des. 426,322 to Anderson, et al. are configured such that at least a portion of the edging is shaped to permit it to be inserted into the ground to form the edging boundary. Other landscape edging systems, such as U.S. Pat. No. 3,788,001 to Balfanz, Jr. and U.S. Pat. No. 2,821,809 to Collier, have a portion of the edging strips buried or covered by soil or other landscaping materials.

In addition, such landscape edging systems may block illumination from certain sources, or increase the difficulty of placing and/or connecting illumination devices to electrical sources. If landscape lighting is positioned inside or outside of such edging strips, the placement of the same would tend to disrupt the appearance of a properly landscaped edging boundary.

Accordingly, there is a need for landscape edging systems that provide for incorporating illumination devices that do not disrupt the appearance of a landscaped boundary. The present invention fulfills this need and provides other related advantages.

SUMMARY OF THE INVENTION

The present invention is directed to an illuminating construction strip. The construction strip has an elongated construction substrate. Contained within the construction substrate are a heat sink disposed in a first slot along a long dimension of the construction substrate, a lighting strip disposed in a first channel along the long dimension of the construction substrate, and a lens disposed in a second slot along the long dimension of the construction substrate. The lighting strip abuts against and is thermally conductive to the heat sink. The lens preferably "floats" closely spaced from a light emitting surface on the lighting strip. The lens and the second slot open into light-emitting channel on a front face of the construction substrate.

The construction substrate is preferably manufactured from plastic, wood, or composite material. The heat sink preferably is a multi-layer, segmented heat-conductive material and is made from corrosion resistant aluminum. A second channel is preferably included adjacent to the first slot along a long dimension of the construction substrate, with the second channel forming an air channel against the heat sink. A thermally conductive adhesive may be included between the heat sink and the lighting strip. The lighting strip is preferably a low voltage LED strip or tape light. The lighting strip preferably has a water ingress protection rating of IP 65 or greater. The lens is preferably made from UV-stable polycarbonate.

Collectively, the construction substrate, heat sink, lighting strip, and lens may be each flexible and bendable along the long dimension of the construction substrate. An edge of the light-emitting channel preferably includes a beveled edge, which creates an angle of exposure ($\alpha$) of between 0° and 70°.

The construction strip may be a landscape edging strip and the construction substrate may be an edging substrate. Alternatively, the construction strip may be construction lumber and the construction substrate may be a decking substrate, a bench substrate, a finishing substrate, or a fencing substrate.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

In the following detailed description, the inventive illuminating construction strip is generally referred to by reference numeral 10 in FIGS. 1-13. In a particularly preferred embodiment (FIGS. 1-7), configured as an illuminating landscape edging strip 10 generally includes a substrate 12 having a plurality of multi-pocket precision cut slots 14 and channels 16 that form a continuous staggered form longitudinally for the entire length, or portion thereof, of standard edging border material manufactured of plastic, wood composite, or similar material. In a particularly preferred embodiment, the lighting edging strip 10 includes a first slot 14a, a first channel 16a, a second slot 14b, and a second channel 16b cut into the substrate 12.

The shape of each slot 14 and channel 16 is of specific design to physically contain different components of the inventive luminaire. The inventive luminaire preferably comprises a heat sink 18, a lighting strip 20, and a lens 22—designed to accommodate the specific size of the selected component. In addition, the continuous staggered form of the slots 14 and channels 16 does not impact the usability of the edging border substrate 12 for its common purpose. The staggered form of the slots 14 and channels 16 provide for securely holding each component of the luminaire and also allow for water to evacuate the space when installed.

The first slot 14a is preferably distal from a front face 12a of the substrate 12 and configured to receive and support a heat sink 18 along the length of the strip 10. The first channel 16a is disposed adjoining to the first slot 14a, more proximate to the front face 12a than the first slot 14a. The first channel 16a is configured to receive and retain a lighting strip 20 such that the same abuts and is maintained in physical contact with the heat sink 18.

The second slot 14b or lens slot 14b is disposed adjoining to the first channel 16a, also adjoining to the front face 12a such that illumination from the lighting strip 20 in the first channel 16a projects through the second slot 14b and away from the front face 12a. The second slot 14b is configured to receive and support a lens 22.—in the case of the lens slot 14b, it is generally sized larger than the lens 22, such that there is an amount of extra space at the top of the lens 22 to facilitate insertion into the second slot 14b.

The lens 22 preferably "floats" closely spaced apart from a light-emitting surface 20a of the lighting strip 20, but may come into contact at some points. This spacing allows the lens 22 to move and flex separately from the lighting strip 20 when the illuminating construction strip 10 is formed in curved or undulating shapes. If the lens 22 abuts the lighting emitting surface 20a at too many points, this may cause friction on the lighting emitting surface 20a and create potential for stress or stretching failure of lens 22 or lighting strip 20.

The lens 22 is preferably transparent to allow the passage of illumination from the lighting strip 20. The lens 22 may also be translucent or have some diffusion or diffraction structures. The second slot 14b is preferably wide enough to accept a turning film or similar structure behind the primary protective lens 22. The lens 22 is preferably made from a durable polymer or plastic material, i.e., UV-stable polycarbonate, to provide flexibility as well as protection for the underlying lighting strip 20 against impacts or abuse from landscaping devices, i.e., edging trimmers, or flung debris. The lens 22 and second slot 14b open into a light-emitting channel 24 that allows for the passage of light from the front face 12a of the substrate 12, creating an illumination field 32.

An upper edge of the light-emitting channel 24 preferably has a beveled edge 26 so as to expand the angle of exposure ($\alpha$) of the illumination field 32 from the lighting strip 20. The beveled edge 26 preferably increases the angle of exposure ($\alpha$) on the upper edge of the light-emitting channel 24 from 0° to about 70°.

The second channel 16b is preferably disposed adjoining the first slot 14a distal from the front face 12a. The second channel 16b serves multiple purposes. The second channel 16b provides space for a tool carving the first slot 14a into the substrate 12 during the manufacturing process for the inventive edging strip 10. This space for the carving tool reduces stress-load on the cutting tool used on the border material. In addition, the second channel 16b reduces friction on the heat sink assembly 18 when manipulating the border material substrate 12 into contoured forms. The second channel 16b also provides an air gap 16b behind the heat sink 18 when it is inserted in the first slot 14a. The air gap 16b allows for airflow behind the heat sink 18 to facilitate heat dissipation.

The heat sink 18 is preferably a multi-layered, segmented heat-dissipating section material, preferably made from corrosion resistant aluminum or similar heat conductive material. The multi-layered, segmented construction aids flexibility of the heat sink 18 during manipulation and installation of the border strip 10. The multi-layer, segmented heat sink 18 assures flexibility to undulate with the installation design while maintaining constant contact with the lighting strip 20.

The lighting strip 20 is preferably a water-resistant, low voltage LED strip or tape light with a water ingress protection rating of IP 65 or higher. The lighting strip 20 is preferably attached to the heat sink 18 by heat-transferring double-sided adhesive 18a or similar material to aid in heat transfer and dissipation.

The flexible nature of the substrate 12 and lighting components creates the ability for the entire length of the strip 10 to undulate in the landscape installation as the edge/bender border material is formed into various shapes fitting the sculpting requirements common to landscape lighting designs. The locations of the slot 14a for the heat sink 18 and the channel 16a for the lighting strip 20 within the substrate material 12 minimizes flexure stress on the lighting strip 20.

Figures 1, 1A:
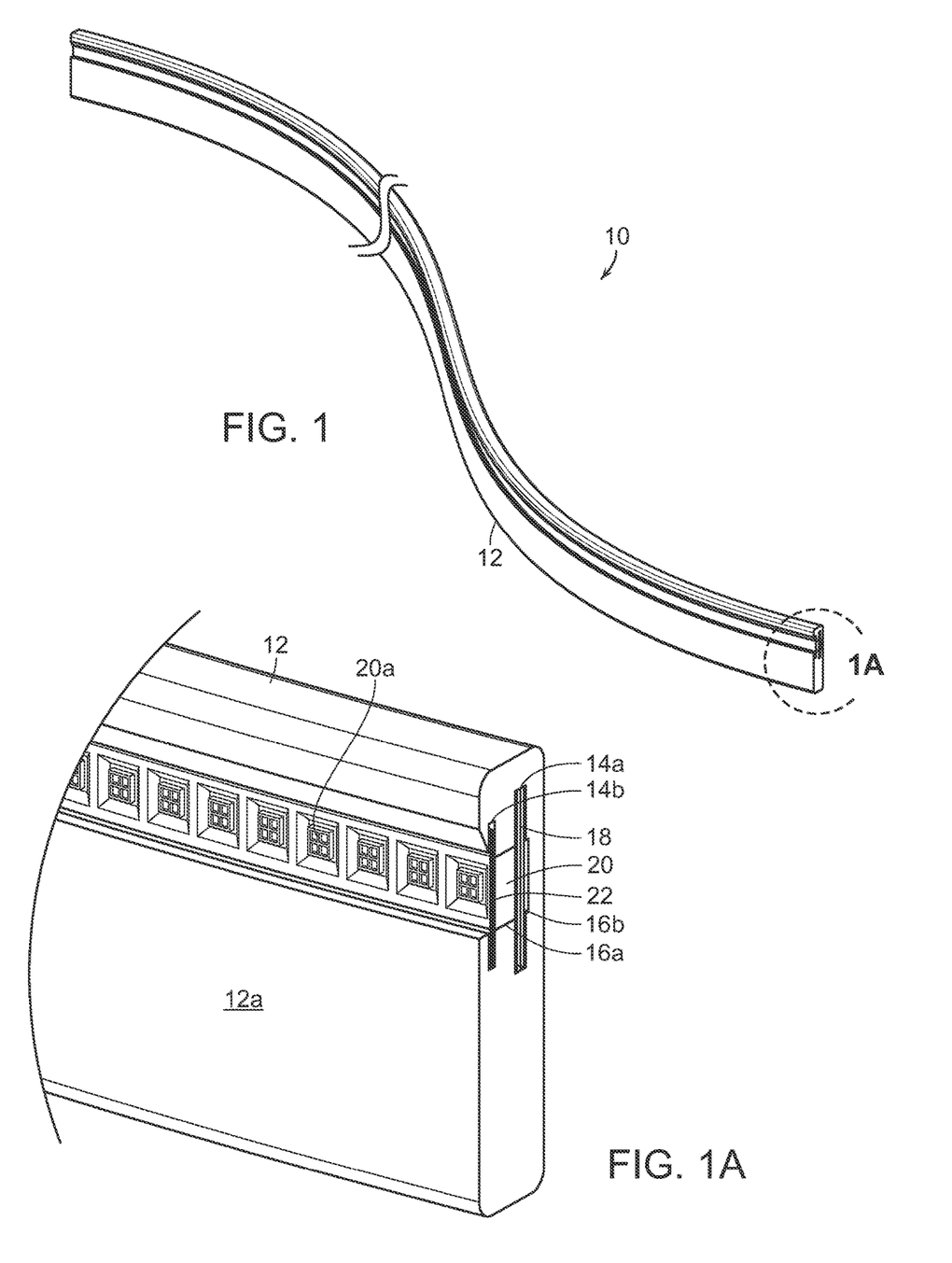
FIG. 1 is a perspective view of an inventive landscape lighting edging strip.
FIG. 1A is a close-up view of and end of and inventive landscape lighting edging strip.
Figure 2:
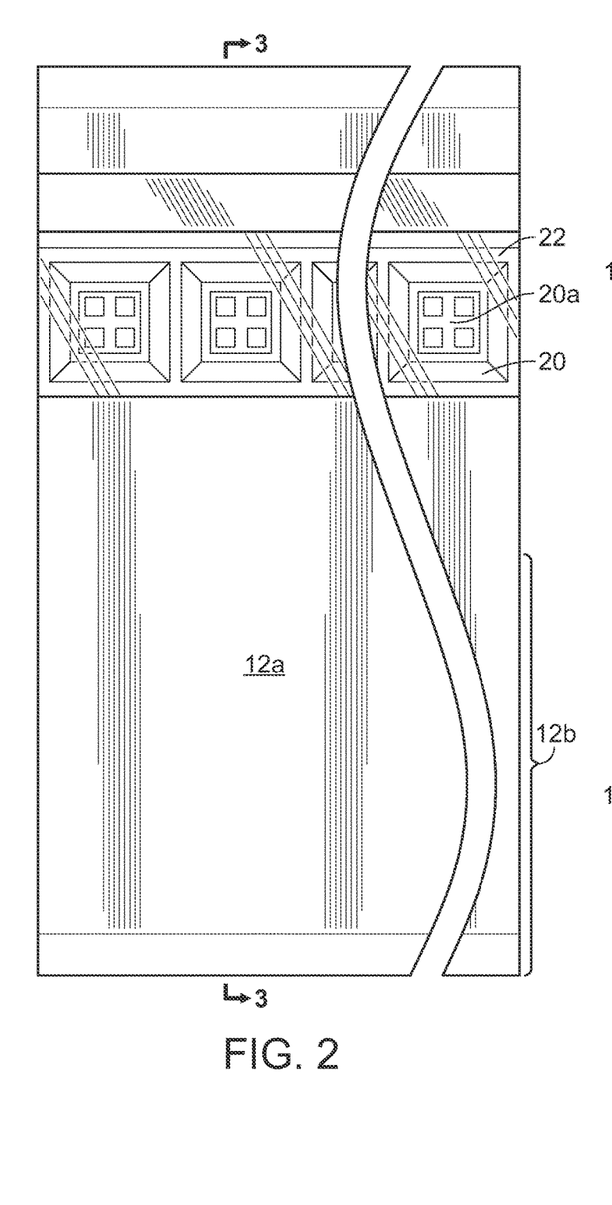
FIG. 2 is a front view of an the landscape lighting edging strip.
Figure 3:
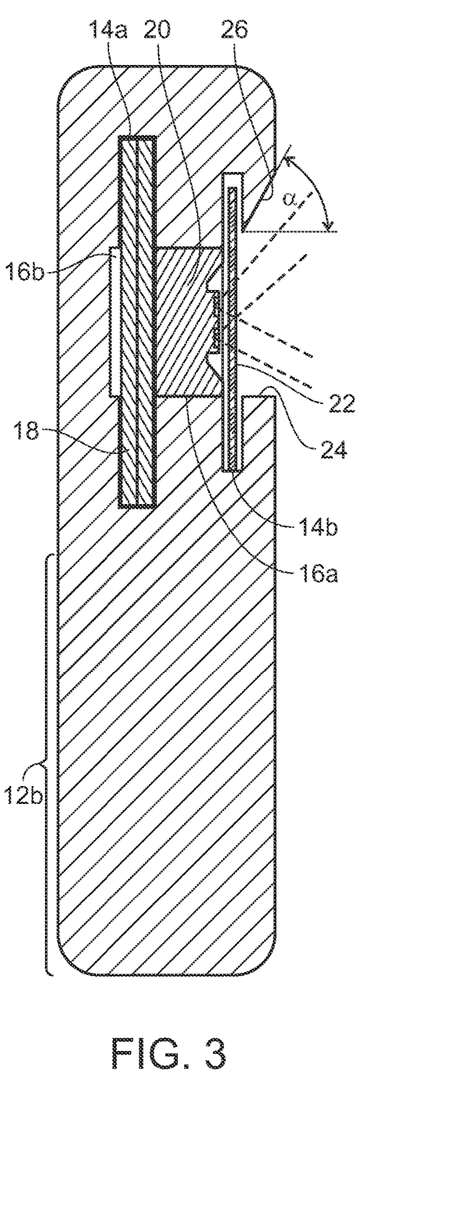
FIG. 3 is a cross-sectional view along line 3-3 of FIG. 2.
Figure 4:
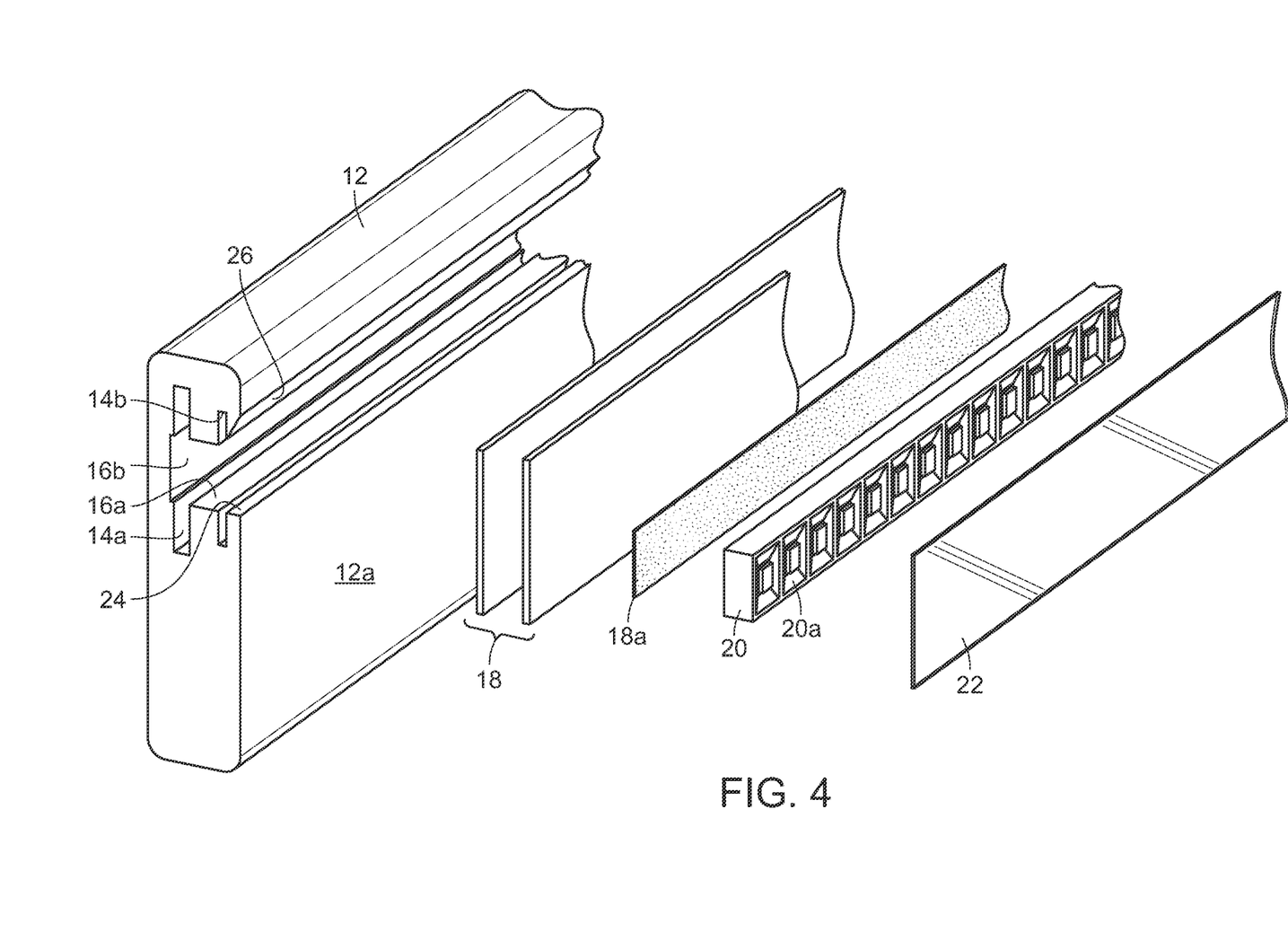
FIG. 4 is an exploded perspective view of the inventive landscape lighting edging strip and the components.
Figure 5:
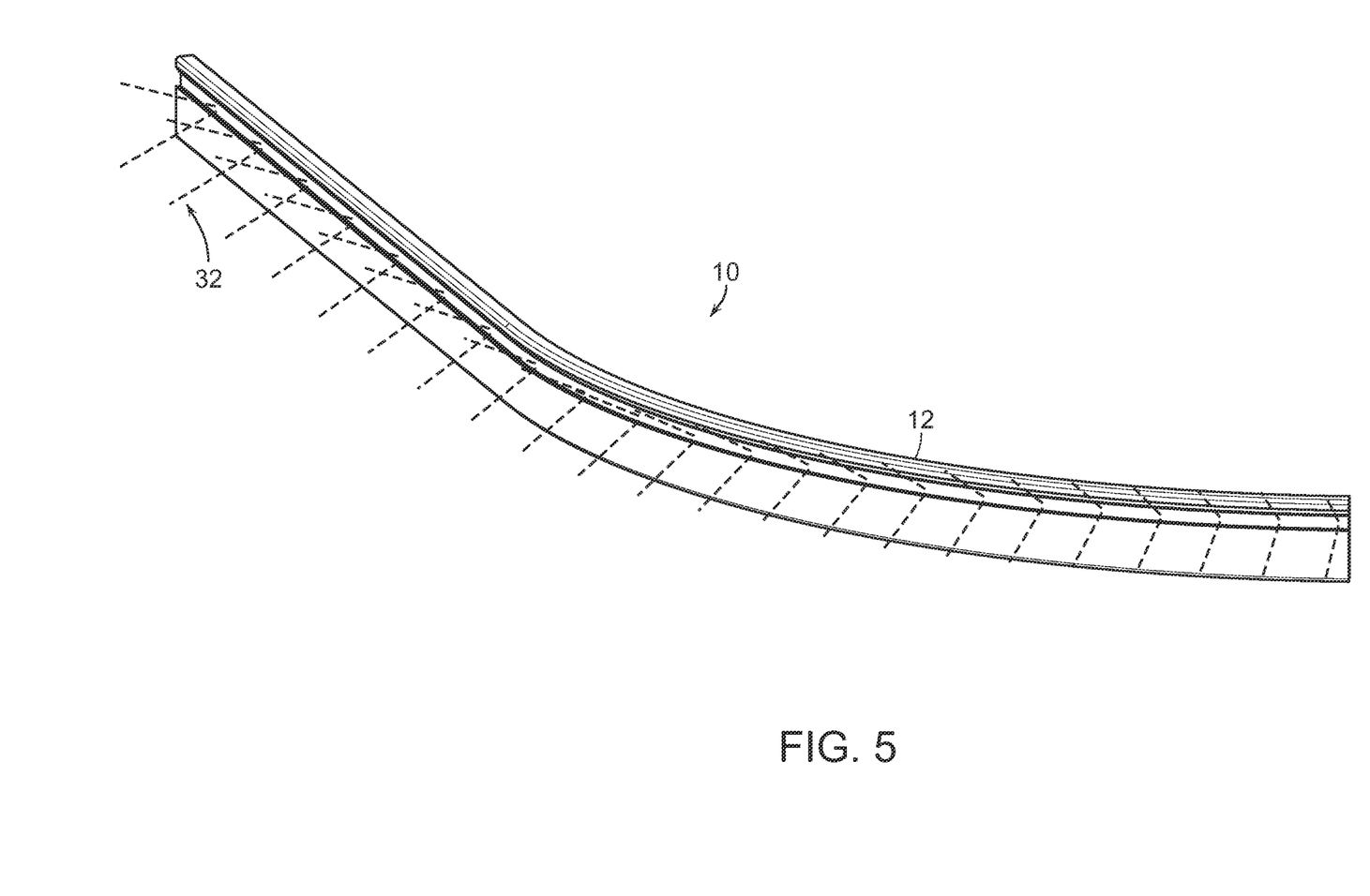
FIG. 5 is a perspective view of the inventive landscape lighting edging strip indicating illumination.
Figure 6:
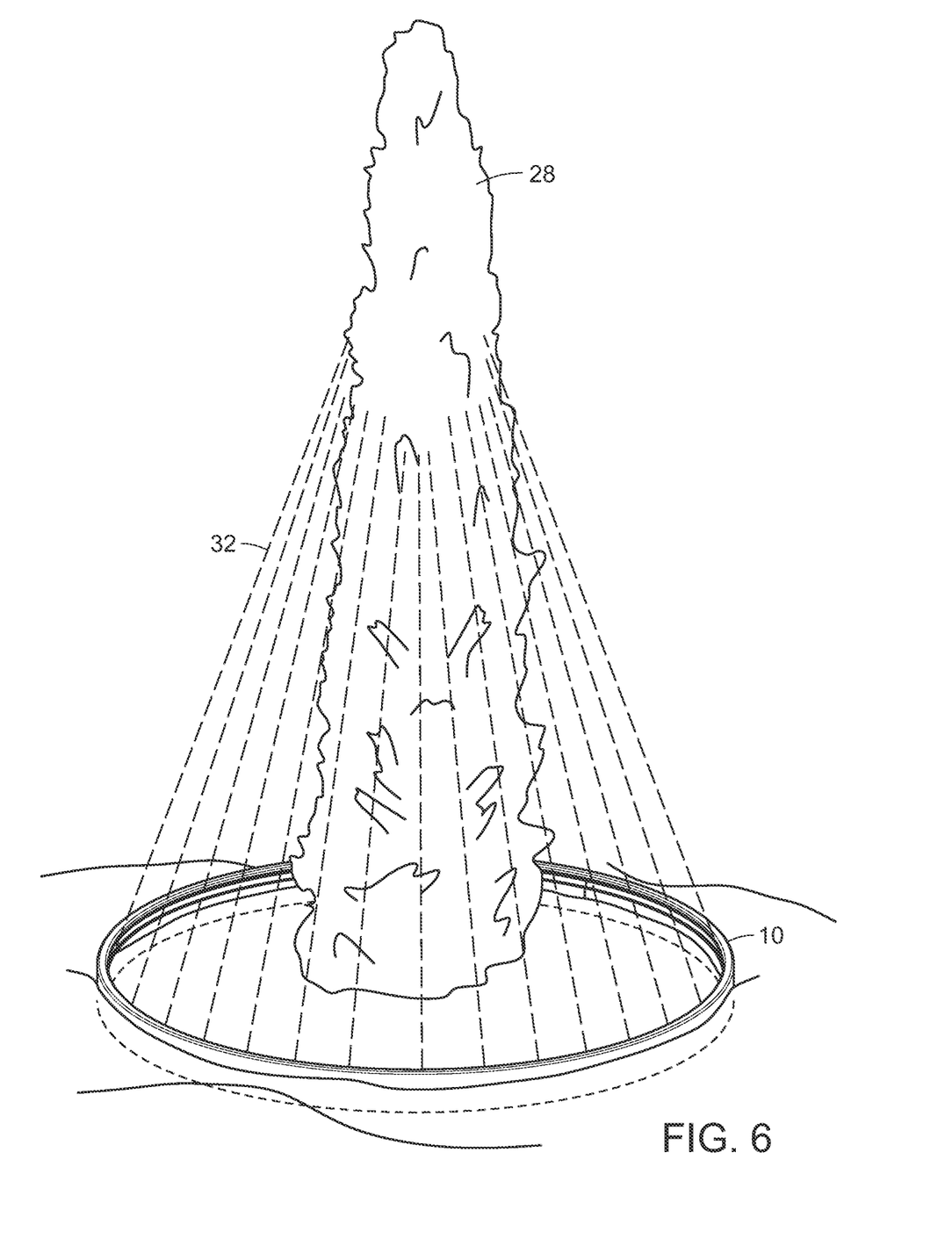
FIG. 6 is an environmental view of the inventive landscape lighting edging strip illuminating a tree.
Figure 7:
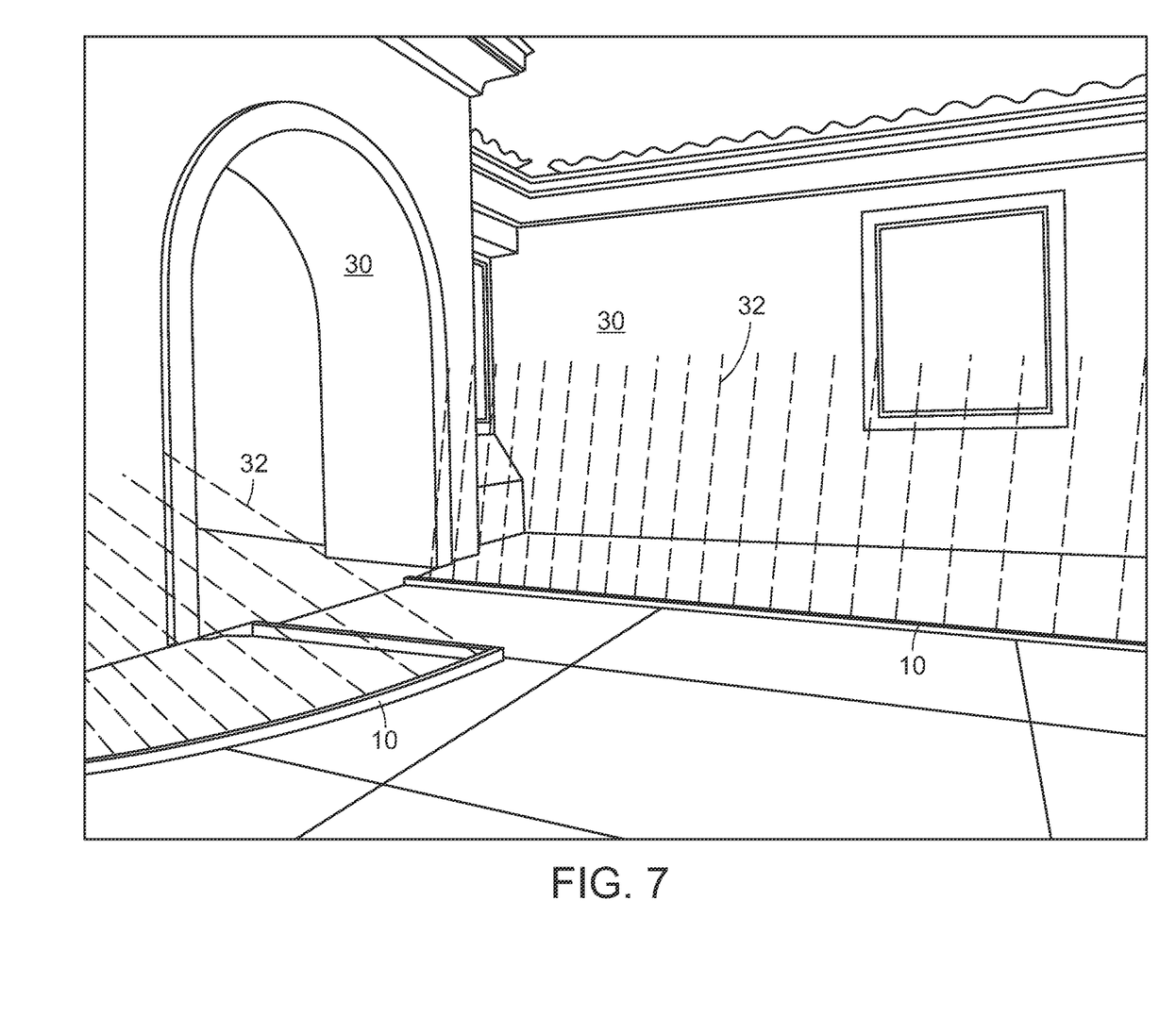
FIG. 7 is an environmental view of the inventive landscape lighting edging strip illuminating a building.
Figure 8:
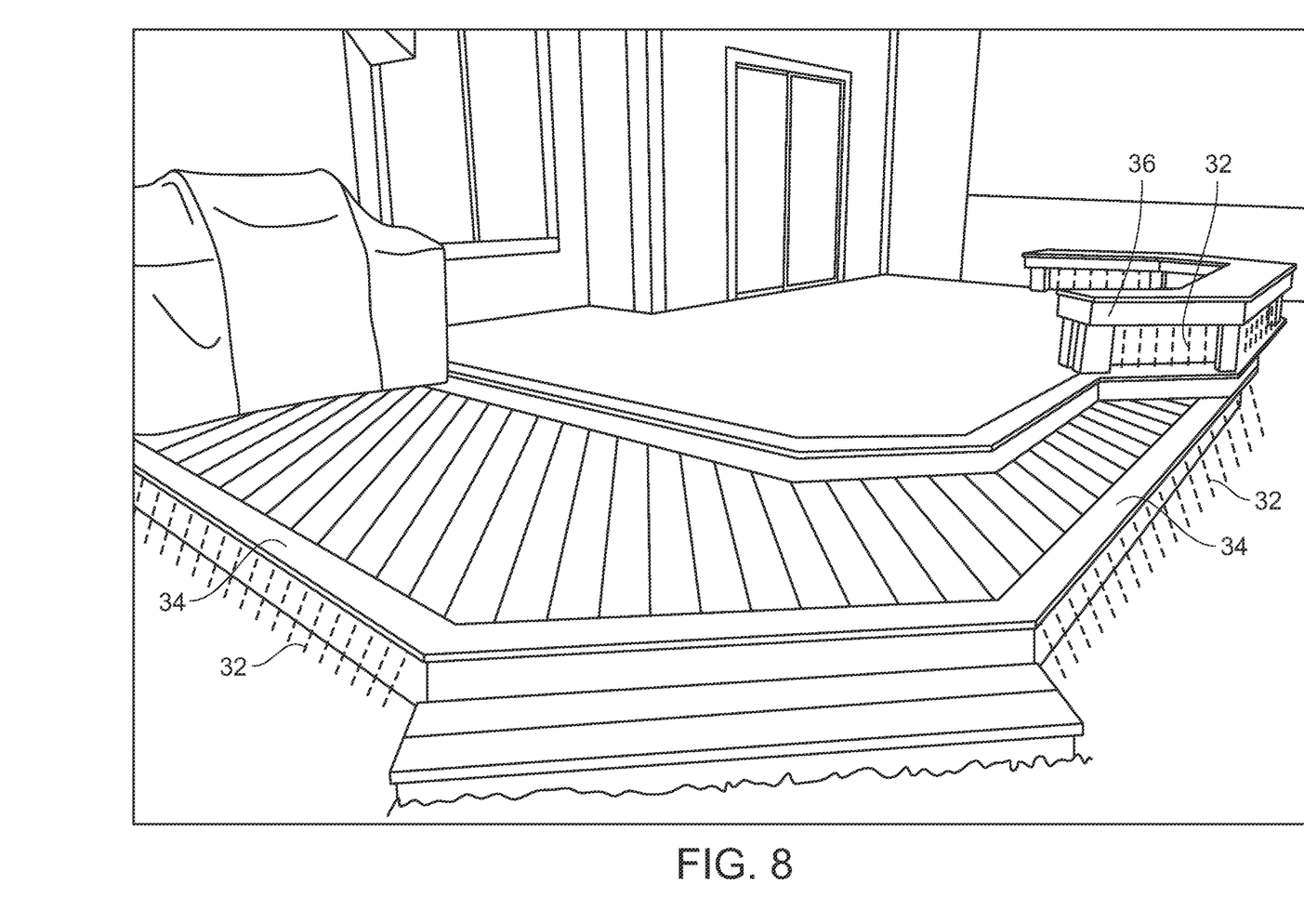
FIG. 8 is an environmental view of the inventive illuminating construction strip installed in decking and benches.
Figure 9:
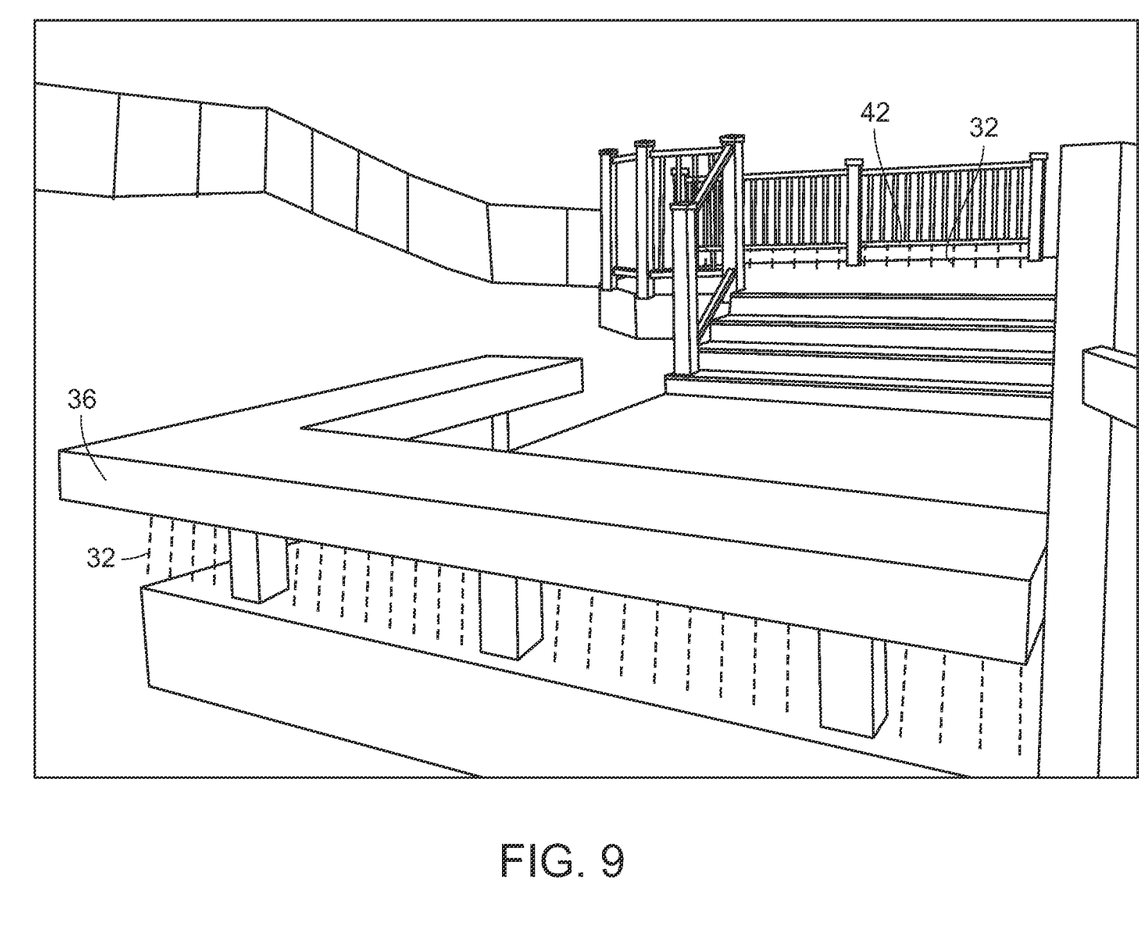
FIG. 9 is an environmental view of the inventive illuminating construction strip installed in benches and fencing.
Figure 10:
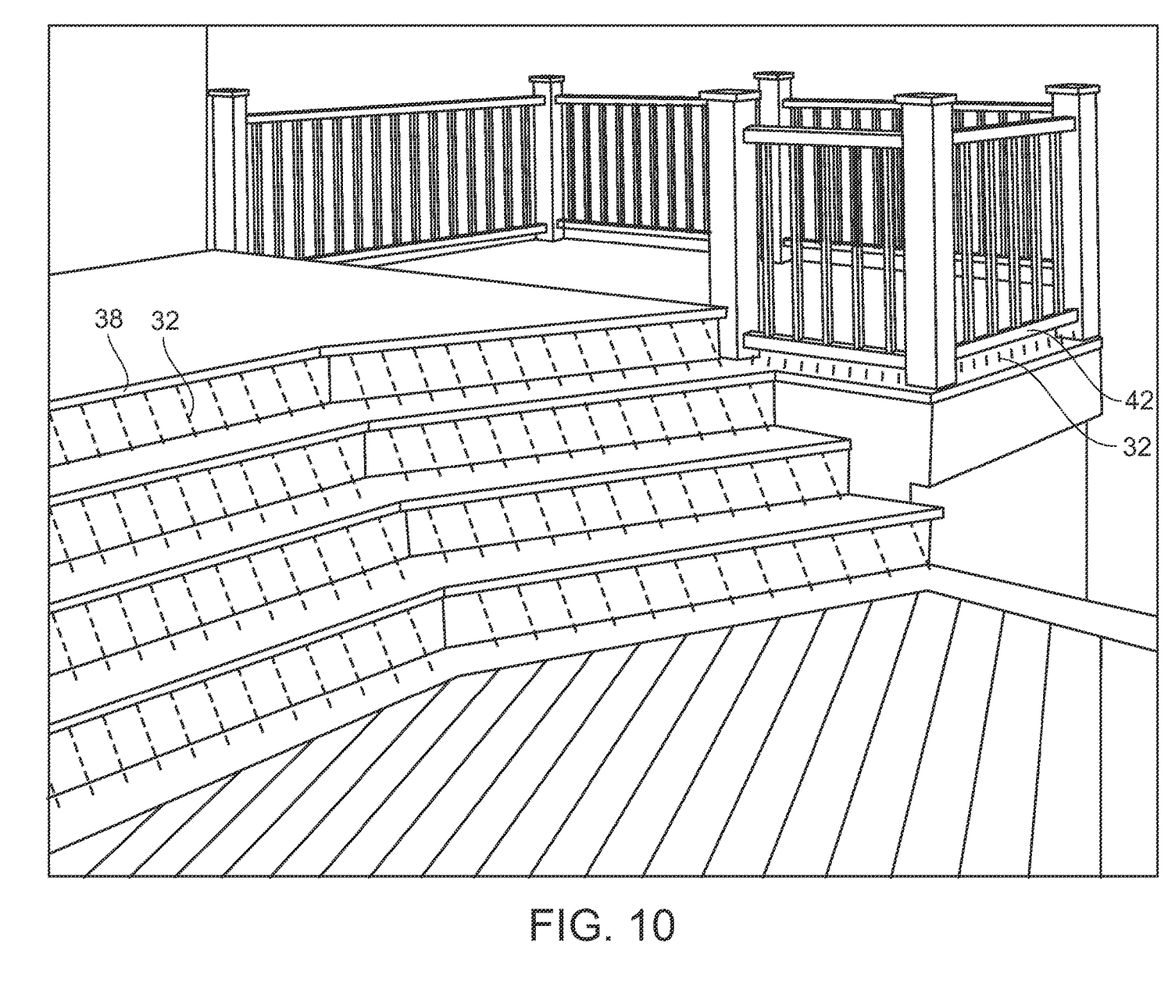
FIG. 10 is an environmental view of the inventive illuminating construction strip installed in stairs and fencing.
Figure 11:
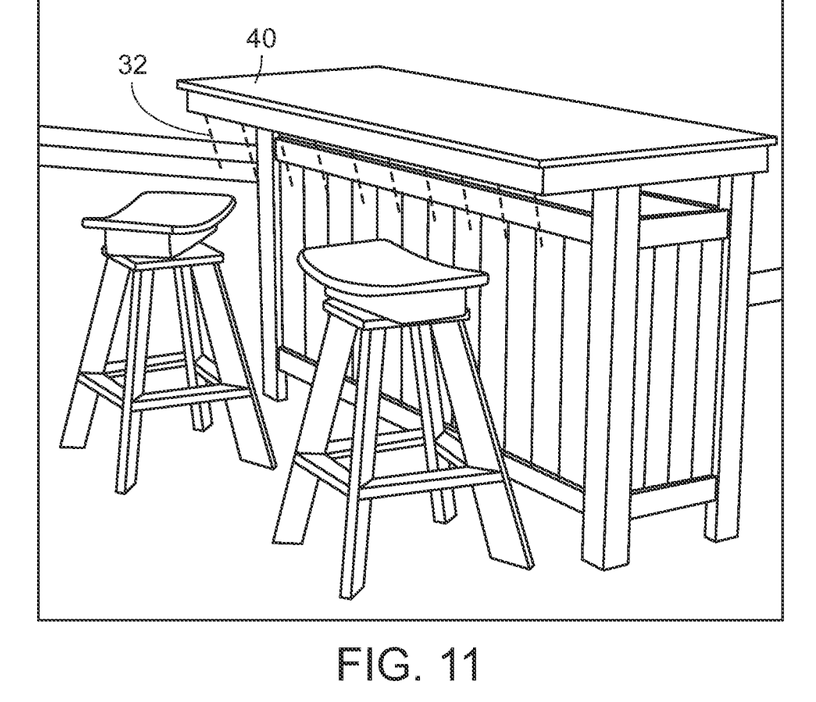
FIG. 11 is an environmental view of the inventive illuminating construction strip installed as trim on an island bar.

As shown in FIGS. 6 and 7, when the edging strip 10 is installed, a lower portion 12b of the substrate 12 is buried in the ground such that the light-emitting channel 24 remains above ground-level. When connected to an electrical source (not shown) the lighting strip 20 emits light through the lens 22 and the light emitting channel 24 so as to create an illumination field 32 around or against landscape features 28 or buildings 30.

Figure 12:
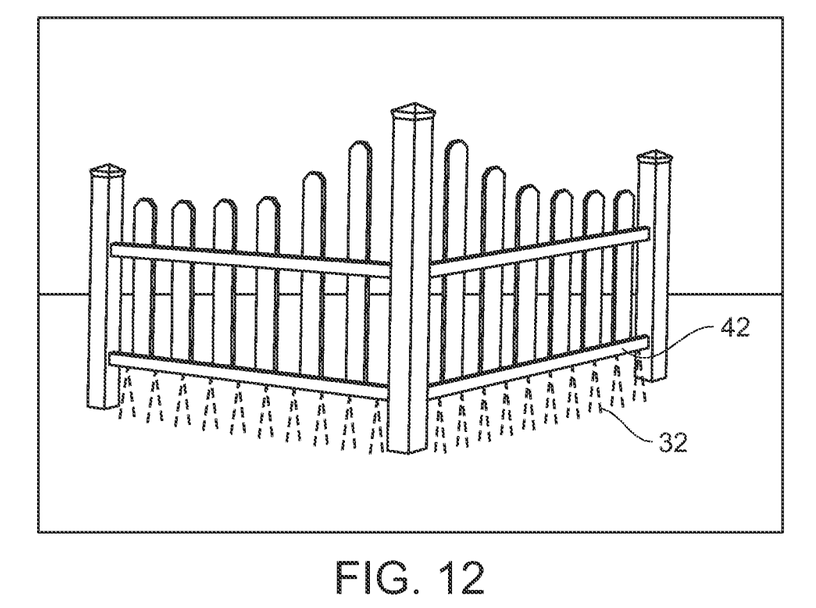
FIG. 12 is an environmental view of the inventive illuminating construction strip installed as a fencing rail.
Figure 13:
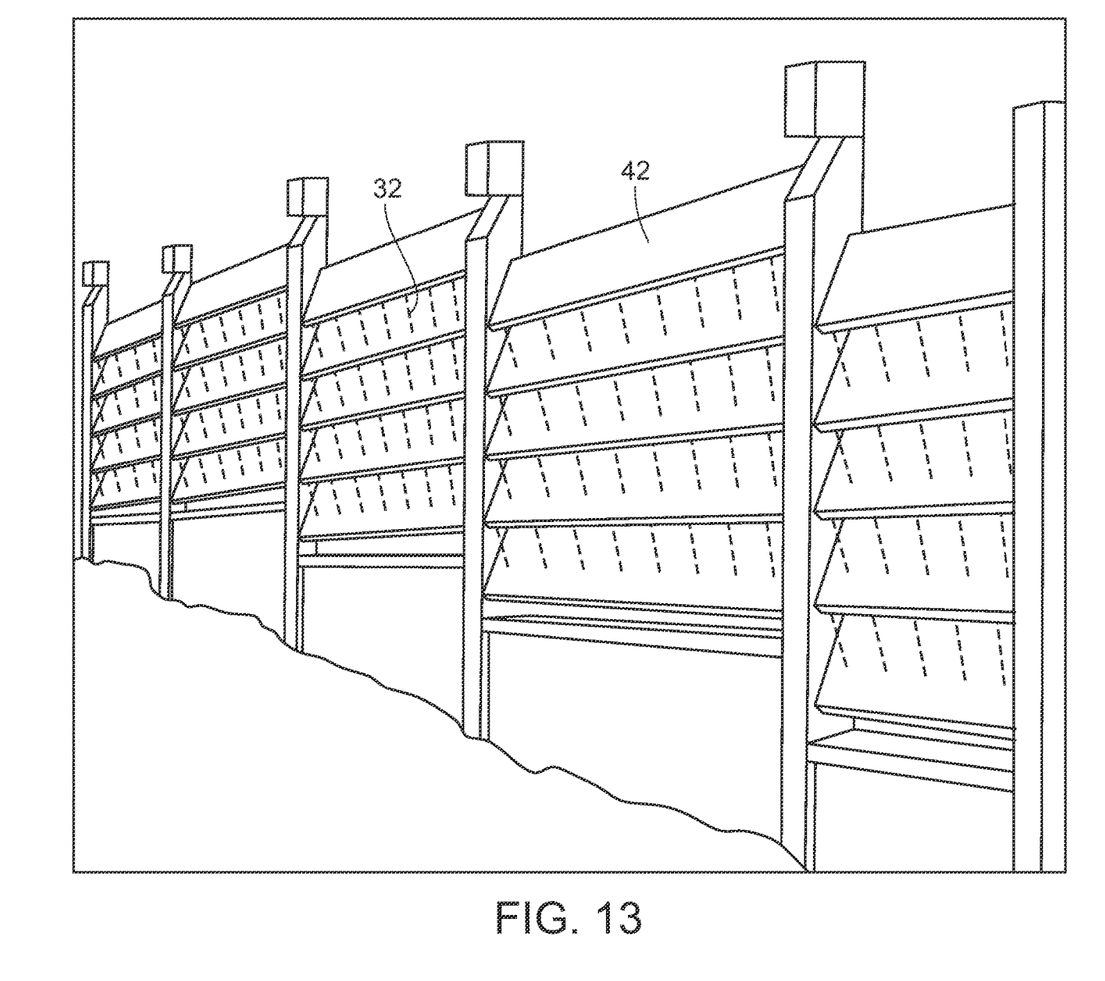
FIG. 13 is an environmental view of the inventive illuminating construction strip installed in as a fencing rail.

In addition to the landscaping edging strip 10 described above, the inventive design can be embodied in other types of substrates 12a, such as lumber or trim that may be installed on constructions. For example, the inventive configuration of slots 14 and channels 16 with installed heat sink 18, lighting strip 20, and lens 22 may be incorporated into lumber or trim substrate 12a that finishes the outward appearance of construction and producing an illumination field 32. Such constructions may include decking 34 (FIG. 8), benches 36 (FIG. 9), stairs 38 (FIG. 10), islands 40 (FIG. 11), and/or fences 42 (FIGS. 12 and 13). In any of these alternate embodiments, it is not necessary that the lumber or trim be flexible as described above, but is still considered possible.

Although multiple preferred embodiments have been described in detail for purposes of illustration, various modifications may be made without departing from the scope and spirit of the invention. Accordingly, the invention is not to be limited, except as by the appended claims.

What is claimed is:

1. An illuminating construction strip configured as a landscape edging strip, comprising:
   an elongated construction substrate configured as an edging substrate;
   a heat sink disposed in a first slot along a long dimension of the construction substrate;
   a lighting strip disposed in a first channel along the long dimension of the construction substrate, wherein the lighting strip is thermally conductive to the heat sink;
   a lens disposed in a second slot along the long dimension of the construction substrate, wherein the lens is closely spaced apart from a light emitting surface on the lighting strip; and
   wherein the lens and the second slot open into a light-emitting channel on a front face of the construction substrate.

2. The illuminating construction strip of claim 1, wherein the heat sink comprises a multi-layer, segmented heat-conductive material.

3. The illuminating construction strip of claim 2, wherein the heat sink is made from corrosion resistant aluminum.

4. The illuminating construction strip of claim 1, further comprising a second channel along a long dimension of the construction substrate, wherein the second channel is adjacent to the first slot, with the second channel forming an air channel against the heat sink.

5. The illuminating construction strip of claim 1, further comprising a thermally conductive adhesive between the heat sink and the lighting strip.

6. The illuminating construction strip of claim 1, wherein the lighting strip comprises a low voltage LED strip or tape light.

7. The illuminating construction strip of claim 6, wherein the lighting strip has a water ingress protection rating of IP 65 or greater.

8. The illuminating construction strip of claim 1, wherein the lens is made from UV-stable polycarbonate.

9. The illuminating construction strip of claim 1, wherein the construction substrate, heat sink, lighting strip, and lens are each flexible and bendable along the long dimension.

10. The illuminating construction strip of claim 1, wherein an edge of the light-emitting channel comprises a beveled edge.

11. The illuminating construction strip of claim 10, wherein the beveled edge creates an angle of exposure ($\alpha$) of between 0° and 70°.

* * * * *